United States Patent [19]
Kent

[11] Patent Number: 5,371,369

[45] Date of Patent: Dec. 6, 1994

[54] CONFORMAL COLD BAFFLE FOR OPTICAL IMAGING SYSTEMS

[75] Inventor: Herbert P. Kent, Swampscott, Mass.

[73] Assignee: Litton Systems, Inc., Lexington, Mass.

[21] Appl. No.: 135,919

[22] Filed: Oct. 13, 1993

[51] Int. Cl.⁵ .............................. G01J 5/06
[52] U.S. Cl. .................... 250/352; 250/332
[58] Field of Search .............. 250/352, 237 R, 332

[56] References Cited

U.S. PATENT DOCUMENTS

| | | | |
|---|---|---|---|
| 2,700,916 | 2/1955 | Muirhead | 250/237 R |
| 2,762,930 | 9/1956 | Onksen, Jr. et al. | 250/237 R |
| 2,788,708 | 4/1957 | Williamson | 250/237 R |
| 3,180,989 | 4/1965 | Hand, Jr. et al. | |
| 3,368,076 | 2/1968 | Clifford | 250/352 |
| 3,413,468 | 11/1968 | Astheimer | |
| 4,041,314 | 8/1977 | Oppelt | 250/352 |
| 4,217,026 | 8/1980 | Radovich | 350/58 |
| 4,225,782 | 9/1980 | Kuppenheimer, Jr. et al. | 250/216 |
| 4,507,551 | 3/1985 | Howard et al. | 250/216 |
| 4,806,761 | 2/1989 | Carson et al. | 250/332 |
| 5,089,705 | 2/1992 | Ueda et al. | 250/352 |

*Primary Examiner*—Carolyn E. Fields
*Attorney, Agent, or Firm*—Michael H. Wallach

[57] ABSTRACT

A cooled stray light baffle for use in an imaging system such as an infrared camera is disclosed. The baffle includes a tapered shroud portion which is shaped to just enclose the envelope of light rays which pass through the baffle. That is, space between the envelope of light rays and the inner surface of the baffle is minimized. This results in minimization of the overall surface area and mass of the baffle, which in turn results in a minimization of the refrigeration load of the system. The lower refrigeration load requires a smaller refrigerator which results in reduced system size, power consumption, vibration, cool-down time and cost of operation. The outer surface of the baffle is covered with a reflective material to reflect light photons. The inner surface is roughened and blackened to absorb stray light photons which enter the baffle.

44 Claims, 4 Drawing Sheets

CONFORMAL COLD BAFFLE FOR OPTICAL IMAGING SYSTEMS

BACKGROUND OF THE INVENTION

Imaging systems such as infrared cameras typically employ baffles to block stray light rays from reaching system detection elements at the image plane of the system. These detection elements typically include one or two-dimensional arrays of detectors arranged in the image plane. Infrared detectors typically respond to low-energy photons which are emitted by all warm surfaces at or around room temperature (200° K–300° K), including the baffle and other system components. These self-emissions can strike the detection elements and "fog" the scene being imaged. The effect especially impairs performance of systems like infrared cameras since their detectors are designed to react to low-energy photons and are therefore extremely sensitive. To reduce self-emission, the components of imaging systems are typically cooled to a temperature between about 16° K and 195° K by a mechanical cryogenic refrigeration subsystem connected to or within the camera. Alternatively, the components can be cooled by coupling them to a reservoir containing liquid air, liquid nitrogen or liquid helium. To prevent frosting of the system components and to minimize the cooling burden on the refrigerator, the cooled components are mounted in a vacuum chamber such as a Dewar case fitted with an entrance window to allow light to reach the detection element.

Depending upon its size, the mechanical refrigeration subsystem can consume large amounts of power and can cause vibration which impairs the optical performance of the system. The larger the refrigerator, the greater the power consumption and vibration. The principal factor driving the size of the refrigerator is the size of the cooling load it is required to handle. If the system cooling load is reduced, a smaller refrigerator is required, resulting in reduced system power consumption, weight, cost and vibration and improved system performance. Where a cooling reservoir is used, a reduced cooling load would reduce the amount of the cryogen consumed in cooling the system. It has been estimated that prior conventional cold shielding devices which include cylindrical stray light baffles constitute at least half the cooling burden of an infrared camera.

SUMMARY OF THE INVENTION

The present invention is directed to a stray light baffle and a method which reduces the overall refrigeration requirement for an imaging system such as an infrared camera. The invention is also directed to an imaging system and infrared camera using the baffle. The baffle of the invention includes a tapered shroud portion which encloses an envelope of light rays between an input aperture and the image plane of the system. Light from a scene enters the baffle through an entrance aperture, passes through the shroud and exits at an exit aperture where it strikes a detection element such as an optical or infrared detector or an array of optical or infrared detectors at the image plane. The shroud surrounds the field of view of the system between the entrance and exit apertures and prevents stray light from reaching the detection element. The shape of the shroud is chosen such that it conforms to the shape of the envelope of light within it. That is, the space within the shroud between the envelope of light rays and the inner surface of the shroud is minimized. This results in minimizing the overall surface area of the baffle while maintaining a complete field of view without interference. Since the surface area is minimized, the amount of photons emitted by components of the system and absorbed by the outer surface of the baffle is minimized. This results in a reduction in the overall refrigeration system burden.

The shape of the baffle also results in the minimization of its mass. This also reduces the cooling burden on the refrigerator and reduces the time required for the camera to reach operating temperature (cool-down time).

In one embodiment, the interior surface of the shroud is blackened and roughened to absorb any stray light which enters the baffle and strikes its inner surface. Also, the external surface of the baffle is polished and coated with a reflective coating to reduce the amount of light absorbed by the outer surface of the baffle.

The baffle of the present invention provides numerous advantages over conventional baffles found in prior systems. Both the surface area and mass of the baffle of the invention are minimized. This substantially reduces the overall system refrigeration burden, resulting in the associated reductions in system power consumption, weight, size, vibration, cool-down time and overall cost. Conventional cylindrical baffles having inner baffling surfaces present a much larger cooling load to the refrigeration system. As a result, the prior systems are necessarily heavier, larger, consume more power, cause larger system vibration, take longer to cool down, cause greater cryogen loss and are more expensive to operate than the system using the baffle of the present invention.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
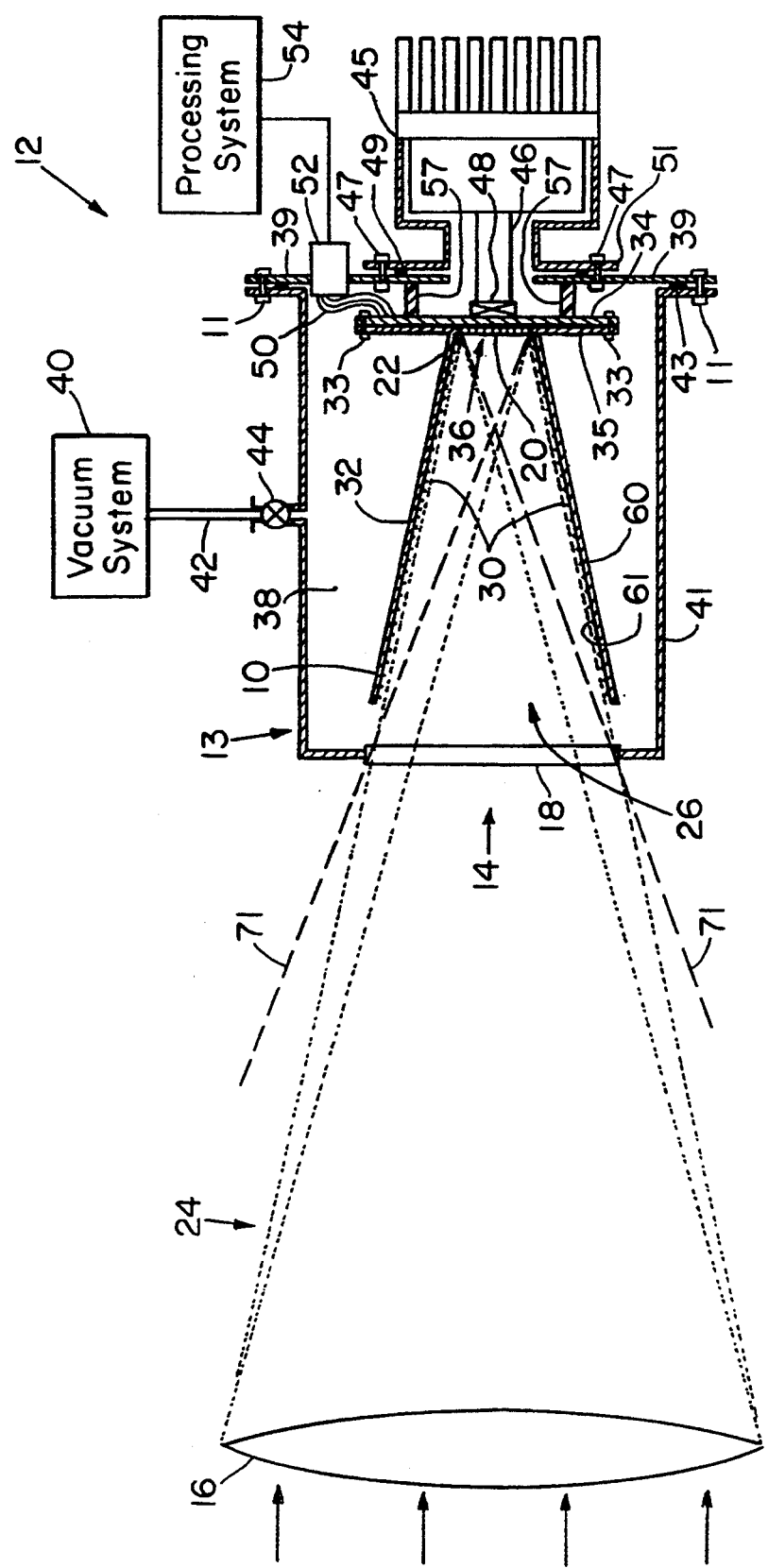
FIG. 1 is a schematic illustration of an optical system using an infrared camera which includes an embodiment of the baffle of the present invention.

FIG. 1 is a schematic illustration of a system using an infrared camera 12 which includes the baffle 10 of the present invention. The camera 12 receives light at its entrance aperture 14 from an optical device 16 which, for purposes of simplicity, is depicted in FIG. 1 as a lens. The optical device 16 is typically a reflecting or refracting telescope. When the camera 12 is used to detect infrared light, the telescope 16 is either a reflecting telescope or a special infrared refracting telescope whose optics are specially designed to pass infrared light. The baffle 10 of the invention will be described below as used in an infrared camera 12. It will be understood that the baffle 10 is applicable to other imaging systems.

The camera 12 is positioned such that the array of infrared detectors 20 is positioned at the image plane 22 of the telescope 16. Light 24 travels from the telescope 16 through the aperture 14 of the camera 12 and then enters the baffle 10 through the baffle input aperture 26. The aperture 14 of the camera includes a window 18 made of a material such as zinc selenide (ZnSe) which is transparent to infrared radiation. The window 18 can also be coated with an optical coating which filters the light 24 by allowing only certain wavelengths of light to reach the detector array 20.

Reference numeral 30 refers to the envelope of light rays which travel through the shroud portion 32 of the baffle 10 to strike the detector array 20. The shroud portion 32 of the baffle 10 is shaped such that it just encloses the envelope 30 of light. That is, space between the inner surface 61 of shroud 32 and the envelope 30 is minimized. The baffle 10 also has an opening or exit aperture 36 at the detector end of the baffle 10. This opening allows the light to impinge on the detector array 20 at the image plane 22.

The baffle 10 and detector array 20 are enclosed within a vacuum chamber 38 by an enclosure 13 such as a Dewar case. The case 13 comprises a valve 44 which can be opened to interface the chamber 38 with a vacuum system 40 via a vacuum line 42. When the valve 44 is open, the vacuum system 40 is used to evacuate the chamber 38. When the chamber 38 is evacuated to a desired pressure, the valve 44 is closed and the vacuum system 40 is disconnected from the camera 12.

The detector array 20 is mounted to the top side of a thermally conductive mounting plate or chip carrier 34. The baffle 10 is also mounted to the chip carrier 34 via a mounting surface 35 of the baffle 10. Four bolts 33 mount the mounting surface 35 of the baffle 10 to the chip carrier 34 via through holes 67 in the mounting surface 35 (see FIG. 2). The chip carrier 34 is physically mounted to the base plate 39 of the case 13 via rigid posts 57 which are typically made of a thermal non-conductive material such as a composite of fiber and glass.

A helium cryostat refrigeration subsystem 45 is mounted to the back side of the base plate 39 of the case 13. The refrigeration subsystem 45 cools the detector array 20 and baffle 10 via its cold finger 46. The cold finger 46 is physically coupled to the chip carrier 34 by a thermally conductive spring 48 which is connected at one end to the cold finger 46. When the camera 12 is assembled, the opposite end of the spring 48 contacts the chip carrier 34. The thermally conductive spring 48 and cold finger 46 conduct heat away from the detector array 20 and baffle 10. The spring 48 is used instead of direct physical contact between the cold finger 46 and the mounting plate 34 to prevent expansion and contraction effects due to temperature fluctuations from altering the relative physical locations of the detector array 20 and telescope 16 and to prevent stressing the array 20. Electrical signals from the detector array 20 are coupled via lines 50 through a hermetically sealed connector 52 to a processing system 54 which receives and processes signals indicative of light detected by the array 20.

The top portion 41 of the Dewar case 13, which includes the filter window 18, is secured to the base plate 39 via bolts 11. An O-ring 43 seals the top 41 to the base plate 39. A flange 51 of the cryogenic refrigerator 45 is bolted to the base plate 39 of the Dewar case 13 by bolts 47. An O-ring 49 seals the flange 51 to the base plate 39.

As mentioned previously, all warm objects radiate low-energy photons which can be detected by the array 20. Specifically, the inner surfaces of the walls of the Dewar case 13 are warm and emit infrared radiation. If the baffle 10 was not present, the infrared photons would strike the detector array 20 and destroy its imaging capability. However, even though the photons are prevented from striking the detector array 20, they can still strike the outer surface 60 of the baffle 10. The photons which are absorbed by the baffle 10 heat the baffle 10 and result in an increased load on the refrigerator 45. To reduce this effect, the outer surface 60 of the baffle 10 is polished and/or coated with a reflective material such as gold to reduce photon absorption by the baffle 10. The photons are reflected away from the baffle 10 rather than being absorbed by it.

It is possible that stray photons can enter the aperture 26 of the baffle 10. To prevent them from reaching the detector array 20, the inner surface 61 of the baffle is roughened and blackened so that any photons striking it will be absorbed.

Figure 2:
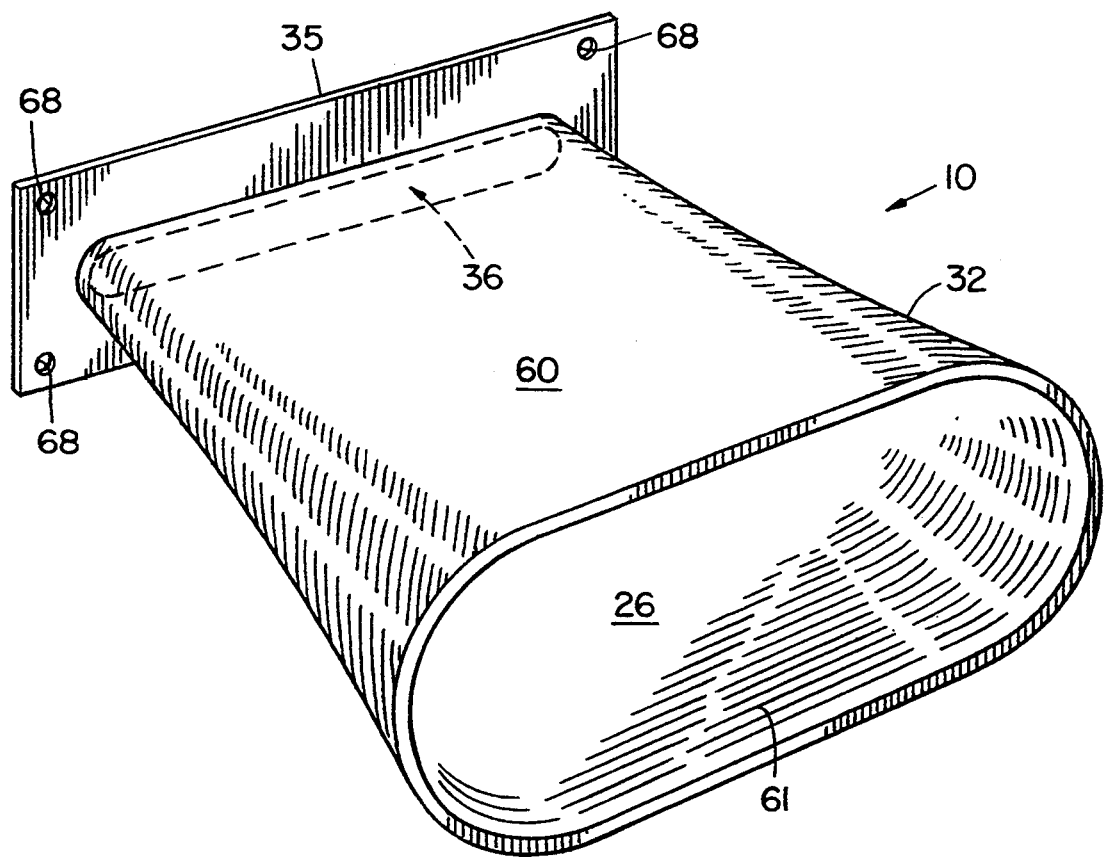
FIG. 2 is a schematic perspective view of the embodiment of the baffle of the present invention shown in FIG. 1.

FIG. 2 is a perspective view of the embodiment of the baffle 10 of the present invention used in the camera 12 of FIG. 1. The exit end of the baffle 10 is connected to a mounting surface 35 at the exit aperture 36. The mounting surface 35 includes four mounting bolt holes 68 used to mount the baffle 10 to the chip carrier 34 shown in FIG. 1. The baffle 10 is made of a thermally conductive material such as oxygen-free high-conductivity copper (OFHC) which is gold plated on its outside surface 60 to make it reflective. The inner surface 61 of the shroud 32 is roughened and blackened such that it absorbs stray photons which enter the baffle 10.

In FIG. 1, dashed lines 71 define the stray light boundary for the camera 12 using the baffle 10. Any stray light rays within this boundary will pass through the window 18 of the Dewar case 13 and will strike the detector array 20. This minimal amount of stray light is acceptable for many applications. However, FIG. 3 illustrates a system which substantially eliminates stray light from the detector array 20.

Figure 3:
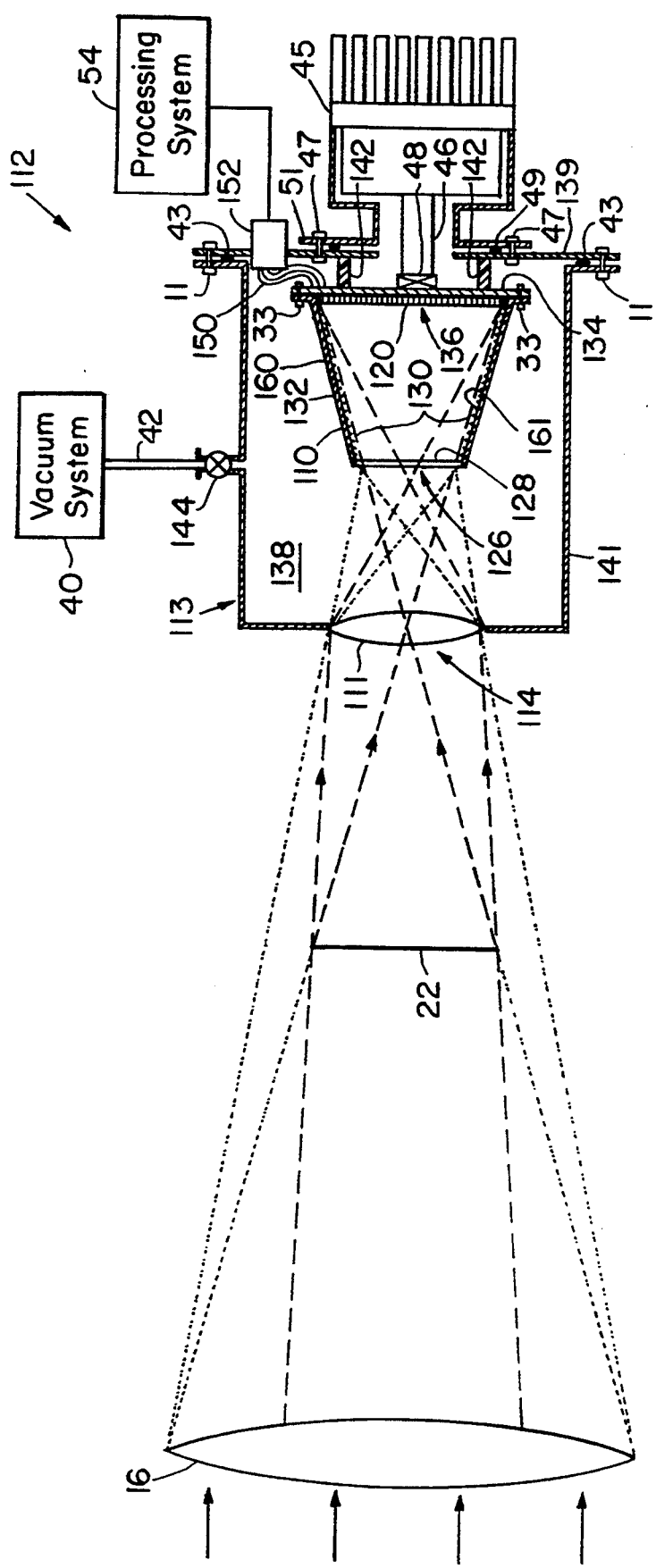
FIG. 3 is a schematic illustration of an optical system using an infrared camera which includes a second embodiment of the baffle of the present invention.

FIG. 3 is a schematic illustration of another infrared camera 112 using another embodiment 110 of the baffle of the present invention. This camera 112 is placed beyond the image plane 22 of the telescope 16. Rather than a simple IR-transparent window, the camera 112 uses a reimaging lens 111 to alter the path of light at the entrance aperture 114 of the camera 112. The reimaging lens 111 forms an image of the focal plane 22 of the telescope 16 on the detector array 120. Thus, an image of the telescope far field is rescaled by the reimaging lens 111 and is formed on the detector array 120. The reimaging lens 111 also forms an image of the aperture of the telescope 16 at the baffle entrance aperture 126 located approximately at the focal point of the lens 111. Thus, the entrance aperture 126 of the baffle 110 is a cold pupil image of the aperture of the telescope 16.

Because of the reimaging lens 111, the shape of the envelope 130 of light rays passing through the camera 112 is different from that of the previous embodiment. As in the previously described embodiment, the shroud 132 of the baffle 110 is shaped to just enclose the envelope 130 of the light rays. This reduces the overall surface area of the baffle 110, resulting in substantially reduced cooling load.

The baffle 110 includes a zinc selenide window 128 across its entrance aperture 126. As described above, the window 128 is transparent to infrared radiation. In addition, if desired, the window 128 can be coated with an optical coating which provides for selective filtering. The coating is chosen such that the window will pass only desired wavelengths of radiation. The exit aperture 136 of the baffle 110 couples the light to the detector array 120.

The infrared camera 112 is similar to the camera 12 of the previously described embodiment. The detector array 120 and the baffle 110 are both mounted to a chip carrier or mounting plate 134. The baffle 110 is mounted to the plate 134 by bolts 33 and is enclosed within a Dewar case 113 which includes a valve 144 coupled to a vacuum system 40 via a vacuum line 42. The vacuum system 40 partially evacuates the chamber 138 of the case 113. The valve 144 is then closed and the camera 112 is detached from the vacuum system 40. The chip carrier 134 is mounted to the base plate 139 of the Dewar case 113 via rigid posts 142 preferably made of a thermally insulating material such as fiberglass. Signals from the array 120 are coupled to a processing system 54 via electrical wires 150 which pass through the base plate 139 via a hermetically sealed connector 152.

The top portion 141 of the Dewar case 113, which includes the reimaging lens 111, is secured to the base plate 139 via bolts 11. An O-ring 43 seals the top 141 to the base plate 139. A flange 51 of the cryogenic refrigerator 45 is bolted to the base plate 139 of the Dewar case 113 by bolts 47. An O-ring 49 seals the flange 51 to the base plate 139.

The cold finger 46 of the refrigerator 45 is coupled to chip carrier 134 via the thermally conductive spring 48. As in the previously described system, this eliminates movement of the detector array 120 relative to the system due to expansion and contraction effects.

As with the previous baffle, the inner surface 161 of the baffle 110 is roughened and blackened to absorb stray light photons which enter the baffle 110. In addition, the outer surface 160 of the baffle 110 is polished and/or coated with a reflective material such as gold to reflect photons which strike the outer surface.

The surface area of the baffle 110 is minimized. Thus, the number of photons from the warm Dewar case walls striking the baffle 110 is minimized. Once again, this reduces the refrigerator burden. In addition, the mass of the baffle 110 is also minimized by the shape of the shroud 132. This also contributes to the reduction in refrigerator burden.

Figure 4:
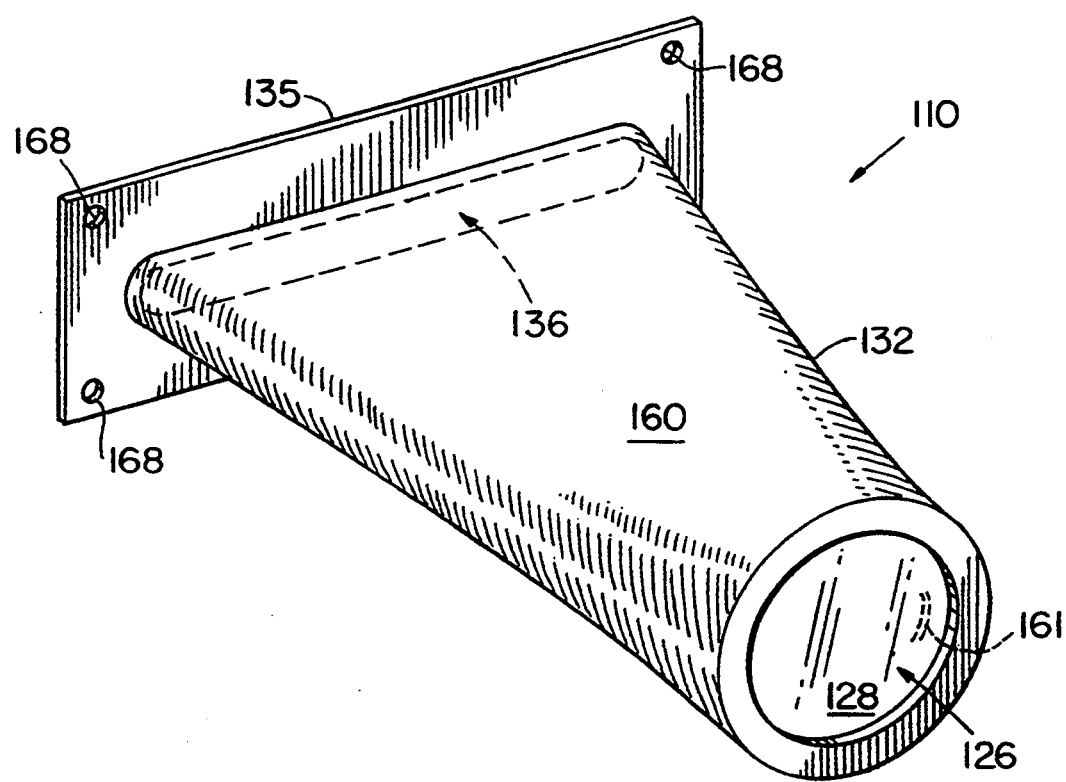
FIG. 4 is a schematic perspective view of the second embodiment of the baffle of the present invention shown in FIG. 3.

FIG. 4 is a schematic perspective view of the baffle 110 used in the camera 112 of FIG. 3. The baffle 110 comprises the input aperture 126 having the filter window 128. In addition, a mounting surface 135 at the output aperture 136 is used to mount the baffle 110 to the chip carrier mounting plate 134 via bolt holes 168. As previously described, the inner surface 161 of the shroud portion 132 is blackened and roughened to absorb stray light photons. The outside surface 160 is polished and/or coated with a reflective material such as gold to reflect photons.

It should be noted that the baffles 10 and 110 described herein are directed to a camera having a linear detector array 20 and 120, that is, a detector array having many times more detectors in one dimension than in an orthogonal dimension. This is most clearly illustrated by the elongated shape of the exit apertures 36 and 136 of the baffles 10 and 110 respectively. Such linear arrays are useful in very common scanning systems which move across a scene and image the scene by viewing only a small strip at a time. It should be noted, however, that the baffles of the invention are applicable to two-dimensional arrays of detectors. In systems using such arrays, the size and shape of the exit aperture and shroud of the baffle would be different than those shown in the embodiments described in. For example, in the case of a square detector array, the exit aperture of the baffle would be square. In that case, the shroud portion of the baffle would be approximately conical in shape. The shroud would taper from the circular entrance aperture to the square exit aperture.

While this invention has been particularly shown and described with references to preferred embodiments thereof, it will be understood by those skilled in the art that various changes in form and details may be made therein without departing from the spirit and scope of the invention as defined by the appended claims.

The invention claimed is:

1. An imaging system comprising:
   an entrance aperture for allowing light from a scene to enter the imaging system:
   a refrigeration subsystem for cooling components of the imaging system;
   a detection element for detecting the light from the scene; and
   a baffle between the entrance aperture and the detection element and cooled by the refrigeration subsystem, the baffle comprising a tapered shroud enclosing an envelope of light rays between the entrance aperture and the detection element, the shroud having a blackened inner surface being shaped such that space between the envelope of light rays and an inner surface of the shroud is minimized.

2. The imaging system of claims 1 wherein an outer surface of the shroud is reflective.

3. The imaging system of claim 1 wherein an outer surface of the shroud is coated with a reflective coating.

4. The imaging system of claim 1 wherein the mass of the baffle is minimized.

5. The imaging system of claim 1 wherein the detection element is an array of optical detectors.

6. The imaging system of claim 1 wherein the detection element comprises an infrared detector.

7. The imaging system of claim 1 wherein the imaging system is an infrared camera.

8. The imaging system of claim 1 wherein the baffle comprises a window for selectively passing light of desired wavelengths.

9. A method of imaging a scene with an imaging system comprising:
   allowing light from the scene to enter the imaging system through an entrance aperture;
   detecting light from the scene with a detection element;
   cooling components of the imaging system with a refrigeration subsystem; and
   coupling a cooled baffle between the entrance aperture and the detection element to block stray light from the detection element, the baffle comprising a tapered shroud enclosing an envelope of light rays between the entrance aperture and the detection element, the shroud being shaped such that space between the envelope of light rays and an inner surface of the shroud is minimized and blackening an inner surface of the shroud.

10. The method of claim 9 wherein an outer surface of the shroud is reflective.

11. The method of claim 9 further comprising coating an outer surface of the shroud with a reflective coating.

12. The method of claim 9 wherein the mass of the baffle is minimized.

13. The method of claim 9 wherein the detection element comprises an array of optical detectors.

14. The method of claim 9 wherein the detecting step comprises detecting infrared radiation.

15. The method of claim 9 wherein the imaging system is an infrared camera.

16. A method of reducing a cooling load on a refrigeration subsystem of an imaging system comprising:
allowing light from a scene to pass through an entrance aperture of the imaging system to a detection element of the imaging system; and
coupling a baffle cooled by the refrigeration subsystem between the entrance aperture and the detection element, the baffle comprising a tapered shroud enclosing an envelope of light rays between the entrance aperture and the detection element, the shroud being shaped such that space between the envelope of light rays and an inner surface of the shroud is minimized and blackening an inner surface of the shroud.

17. The method of claim 16 wherein an outer surface of the shroud is reflective.

18. The method of claim 16 further comprising coating an outer surface of the shroud with a reflective coating.

19. The method of claim 16 wherein the mass of the baffle is minimized.

20. The method of claim 16 wherein the detection element comprises an array of optical detectors.

21. The method of claim 16 wherein the detection element comprises an infrared detector.

22. The method of claim 16 wherein the imaging system is an infrared camera.

23. An imaging system comprising:
an entrance aperture for allowing light from a scene to enter the imaging system;
a refrigeration subsystem for cooling components of the imaging system;
a detection element for detecting the light from the scene; and
a baffle between the entrance aperture and the detection element and cooled by the refrigeration subsystem, the baffle comprising a tapered shroud enclosing an envelope of light rays between the entrance aperture and the detection element, the shroud having a roughened inner surface being shaped such that space between the envelope of light rays and an inner surface of the shroud is minimized.

24. The imaging system of claim 23 wherein an outer surface of the shroud is reflective.

25. The imaging system of claim 24 wherein an outer surface of the shroud is coated with a reflective coating.

26. The imaging system of claim 23 wherein the mass of the baffle is minimized.

27. The imaging system of claim 23 wherein the detection element is an array of optical detectors.

28. The imaging system of claim 23 wherein the detection element comprises an infrared detector.

29. The imaging system of claim 23 wherein the imaging system is an infrared camera.

30. The imaging system of claim 23 wherein the baffle comprises a window for selectively passing light of desired wavelengths.

31. A method of imaging a scene with an imaging system comprising:
allowing light from the scene to enter the imaging system through an entrance aperture;
detecting light from the scene with a detection element;
cooling components of the imaging system with a refrigeration subsystem; and
coupling a cooled baffle between the entrance aperture and the detection element to block stray light from the detection element, the baffle comprising a tapered shroud enclosing an envelope of light rays between the entrance aperture and the detection element, the shroud being shaped such that space between the envelope of light rays and an inner surface of the shroud is minimized and roughening an inner surface of the shroud.

32. The method of claim 31 wherein an outer surface of the shroud is reflective.

33. The method of claim 31 further comprising coating an outer surface of the shroud with a reflective coating.

34. The method of claim 31 wherein the mass of the baffle is minimized.

35. The method of claim 31 wherein the detection element comprises an array of optical detectors.

36. The method of claim 31 wherein the detecting step comprises detecting infrared radiation.

37. The method of claim 31 wherein the imaging system is an infrared camera.

38. A method of reducing a cooling load on a refrigeration subsystem of an imaging system comprising:
allowing light from a scene to pass through an entrance aperture of the imaging system to a detection element of the imaging system; and
coupling a baffle cooled by the refrigeration subsystem between the entrance aperture and the detection element, the baffle comprising a tapered shroud enclosing an envelope of light rays between the entrance aperture and the detection element, the shroud being shaped such that space between the envelope of light rays and an inner surface of the shroud is minimized and roughening an inner surface of the shroud.

39. The method of claim 38 wherein an outer surface of the shroud is reflective.

40. The method of claim 38 further comprising coating an outer surface of the shroud with a reflective coating.

41. The method of claim 38 wherein the mass of the baffle is minimized.

42. The method of claim 38 wherein the detection element comprises an array of optical detectors.

43. The method of claim 38 wherein the detection element comprises an infrared detector.

44. The method of claim 38 wherein the imaging system is an infrared camera.

* * * * *